(12) United States Patent
Tanimura et al.

(10) Patent No.: US 11,608,758 B2
(45) Date of Patent: Mar. 21, 2023

(54) HYDROGEN/OXYGEN STOICHIOMETRIC COMBUSTION TURBINE SYSTEM

(71) Applicant: KAWASAKI JUKOGYO KABUSHIKI KAISHA, Kobe (JP)

(72) Inventors: Kazuhiko Tanimura, Akashi (JP); Hikaru Sano, Kobe (JP); Satoshi Nakayama, Kobe (JP); Naoki Miyake, Siso (JP); Akihisa Oka, Kakogawa (JP)

(73) Assignee: KAWASAKI JUKOGYO KABUSHIKI KAISHA, Chuo-ku (JP)

( * ) Notice: Subject to any disclaimer, the term of this patent is extended or adjusted under 35 U.S.C. 154(b) by 830 days.

(21) Appl. No.: 16/527,649

(22) Filed: Jul. 31, 2019

(65) Prior Publication Data

US 2019/0390577 A1    Dec. 26, 2019

Related U.S. Application Data

(63) Continuation of application No. PCT/JP2018/003311, filed on Jan. 31, 2018.

(30) Foreign Application Priority Data

Feb. 3, 2017    (JP) .............................. JP2017-018472

(51) Int. Cl.
*F01K 25/00* (2006.01)
*F01K 23/10* (2006.01)

(52) U.S. Cl.
CPC ............ *F01K 25/005* (2013.01); *F01K 23/10* (2013.01)

(58) Field of Classification Search
CPC .. F05D 2260/601; F01K 21/04; F01K 25/005; F01K 23/10; F01K 23/106; F01K 23/14; F22B 1/003; F22B 1/1815; F02C 3/22
See application file for complete search history.

(56) References Cited

U.S. PATENT DOCUMENTS

| 4,074,708 A | 2/1978 | Hochmuth | |
| 4,609,328 A * | 9/1986 | Cirrito | F04F 5/467 417/89 |
| 5,755,089 A | 5/1998 | Vanselow | |
| 5,775,091 A * | 7/1998 | Bannister | F01D 5/084 60/39.465 |

(Continued)

FOREIGN PATENT DOCUMENTS

| AT | 94317 B | 9/1923 | |
| CN | 104061028 A | 9/2014 | |
| CN | 104343752 A * | 2/2015 | ................ F04F 5/16 |

(Continued)

*Primary Examiner* — Todd E Manahan
*Assistant Examiner* — Sean V Meiller
(74) *Attorney, Agent, or Firm* — Sughrue Mion, PLLC

(57) ABSTRACT

A hydrogen/oxygen stoichiometric combustion turbine system includes: a high-pressure steam turbine (2); a low-pressure steam turbine (3); and a heater (5) disposed between the high-pressure and low-pressure steam turbines. The heater (5) has a combustion portion (53) in which stoichiometric combustion of hydrogen and oxygen is caused, and a mixing portion (55) configured to mix discharged steam (S4) from the high-pressure steam turbine (2) with combustion gas (R) from the combustion portion (53) and to supply the obtained product to the low-pressure steam turbine (3).

8 Claims, 3 Drawing Sheets

(56) References Cited

U.S. PATENT DOCUMENTS 5,953,900 A    9/1999  Bannister et al.
6,474,069 B1 * 11/2002 Smith ..................... F02C 6/16
                                                    60/39.182

FOREIGN PATENT DOCUMENTS

| CN | 104343752 A | 2/2015 |
|---|---|---|
| DE | 697 18 337 T2 | 9/2003 |
| JP | 07-208192 A | 8/1995 |
| JP | 09-510276 A | 10/1997 |
| JP | 10-306709 A | 11/1998 |
| JP | 2006-17367 A | 1/2006 |
| WO | 98/12421 A1 | 3/1998 |

* cited by examiner

HYDROGEN/OXYGEN STOICHIOMETRIC COMBUSTION TURBINE SYSTEM

CROSS REFERENCE TO THE RELATED APPLICATION

This application is a continuation application, under 35 U.S.C. § 111(a) of international patent application No. PCT/JP2018/003311, filed Jan. 31, 2018, which claims priority to Japanese patent application No. 2017-018472, filed Feb. 3, 2017, the entire disclosure of which is herein incorporated by reference as a part of this application.

BACKGROUND OF THE INVENTION

Field of the Invention

The present invention relates to a hydrogen/oxygen stoichiometric combustion turbine system applicable to a combined cycle power plant.

Description of Related Art

A CCPP (combined cycle power plant) has received attention as technology for reducing $CO_2$ in order to prevent global warming and suppress climate change. It is suggested that a hydrogen/oxygen stoichiometric combustion or equivalent combustion turbine (commonly called "hydrogen turbine") is used for the combined cycle power plant. However, in a hydrogen/oxygen stoichiometric combustion turbine, since a combustion temperature reaches 3000° C., the temperature of combustion gas is required to be reduced to a temperature in a range in which a combustion chamber of a combustor wall can be protected and a turbine portion can be also implemented by steam cooling technology.

In order to meet such a request, a system has been suggested as a CCPP in which an exhaust gas boiler (heat exchanger) recovers heat of exhaust gas from a gas turbine engine as steam, and a hydrogen/oxygen stoichiometric combustion type heater (combustor) is disposed upstream of a steam turbine (for example, Patent Document 1). In this system, steam from an exhaust heat boiler is supplied to the steam turbine. At this time, in the heater, stoichiometric combustion of hydrogen and oxygen is caused, and the combustion gas is diluted and cooled by high-temperature and high-pressure steam from the exhaust gas boiler, and the steam is supplied to the steam turbine.

RELATED DOCUMENT

Patent Document

[Patent Document 1] JP Laid-open Patent Publication No. H07-208192

SUMMARY OF THE INVENTION

However, in the combined cycle power plant disclosed in Patent Document 1, even if combustion gas (generally, 2800 to 3000° C.) generated by the stoichiometric combustion of hydrogen and oxygen is diluted by discharged steam (generally, 500 to 600° C.) from the exhaust gas boiler, the gas still has a high temperature. If such a high-temperature combustion gas is introduced into the steam turbine, a problem associated with heat resistance arises in metal components of the steam turbine. In order to avoid the problem, an amount of stoichiometric combustion of hydrogen and oxygen needs to be reduced. However, if an amount of stoichiometric combustion of hydrogen and oxygen is reduced, output and thermal efficiency of the power plant are reduced.

An object of the present invention is to provide a hydrogen/oxygen stoichiometric combustion turbine system that allows reduction of $CO_2$ generation and improvement of output and thermal efficiency.

In order to attain the aforementioned object, a hydrogen/oxygen stoichiometric combustion turbine system according to the present invention includes: a high-pressure steam turbine; a low-pressure steam turbine; and a heater disposed between the high-pressure and low-pressure steam turbines. The heater has: a combustion portion in which stoichiometric combustion of hydrogen and oxygen is caused or effected to provide a high-temperature steam; and a mixing portion configured to introduce discharged steam, discharged from the high-pressure steam turbine, into combustion gas (high-temperature steam) from the combustion portion and to supply the obtained product to the low-pressure steam turbine.

In this configuration, the combustion gas (high-temperature steam) generated by stoichiometric combustion of hydrogen and oxygen is quenched (quickly cooled) by the discharged steam which has a relatively low temperature and which is discharged from the high-pressure steam turbine. Thus, the temperature of steam supplied to the low-pressure steam turbine can be adjusted so as to be not higher than a heat-resistance limit temperature of the steam turbine metal component which is cooled with steam in a cooling structure similar to that of the gas turbine engine. Furthermore, an amount of stoichiometric combustion of hydrogen and oxygen need not be reduced, whereby output and thermal efficiency can be improved. By the hydrogen turbine being used, $CO_2$ generation can be reduced.

In the present invention, the combustion portion may have: a combustion chamber in which stoichiometric combustion of hydrogen and oxygen is caused; and an ejector configured to eject the high-temperature steam (combustion gas) from the combustion chamber into a mixing chamber, formed in the mixing portion, and to draw the discharged steam. The mixing portion may have a diffuser configured to expand and mix steam from the ejector, and increase pressure of the steam. In this configuration, steam having appropriate temperature and pressure can be obtained with a simple structure.

In the present invention, the combustion portion may have: a combustion chamber in which stoichiometric combustion of hydrogen and oxygen is caused; and a cooling chamber configured to cover the combustion chamber from an outer side and cool it. A part of main steam supplied to the high-pressure steam turbine may be introduced as cooling steam into the cooling chamber. In this case, main steam can be effectively utilized as a coolant without separately using a coolant, to cool the combustion chamber.

In the present invention, the combustion portion may include a combustion chamber wall that forms the combustion chamber, and the combustion chamber wall may be provided with a steam guiding hole for guiding the cooling steam in the cooling chamber, into the combustion chamber, and allowing film-cooling for an inner surface of the combustion chamber wall. Thus, film-cooling for the combustion chamber wall that forms the combustion chamber is performed, and, therefore, the combustion chamber wall can be suppressed from having a high temperature with a simple structure in which the steam guiding hole is merely formed in the combustion chamber wall.

In the present invention, the hydrogen/oxygen stoichiometric combustion turbine system further may include: a gas turbine engine connected to the low-pressure steam turbine and the high-pressure steam turbine; and an exhaust gas boiler configured to use exhaust gas of the gas turbine engine as a heat source. Main steam obtained by the exhaust gas boiler may be supplied to the high-pressure steam turbine. Thus, exhaust gas from the gas turbine engine can be effectively utilized without waste when both the steam turbines, the gas turbine engine, and the exhaust gas boiler are used in combination. As a result, a high-output and high-efficiency system can be obtained.

In the present invention, secondary steam obtained at an intermediate portion of the exhaust gas boiler may be supplied to an intermediate stage of the low-pressure steam turbine. Thus, at the intermediate stage of the low-pressure steam turbine and the following stages, steam pressure can be increased to improve output.

In the present invention, the hydrogen/oxygen stoichiometric combustion turbine system further may include: a generator driven by the low-pressure steam turbine; the high-pressure steam turbine; and the gas turbine engine. In this configuration, rotary force obtained by the gas turbine engine and rotary forces from both the steam turbines are added. Therefore, the generator can be driven with enhanced rotary force. As a result, a high-output and high-efficiency generation system can be obtained.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
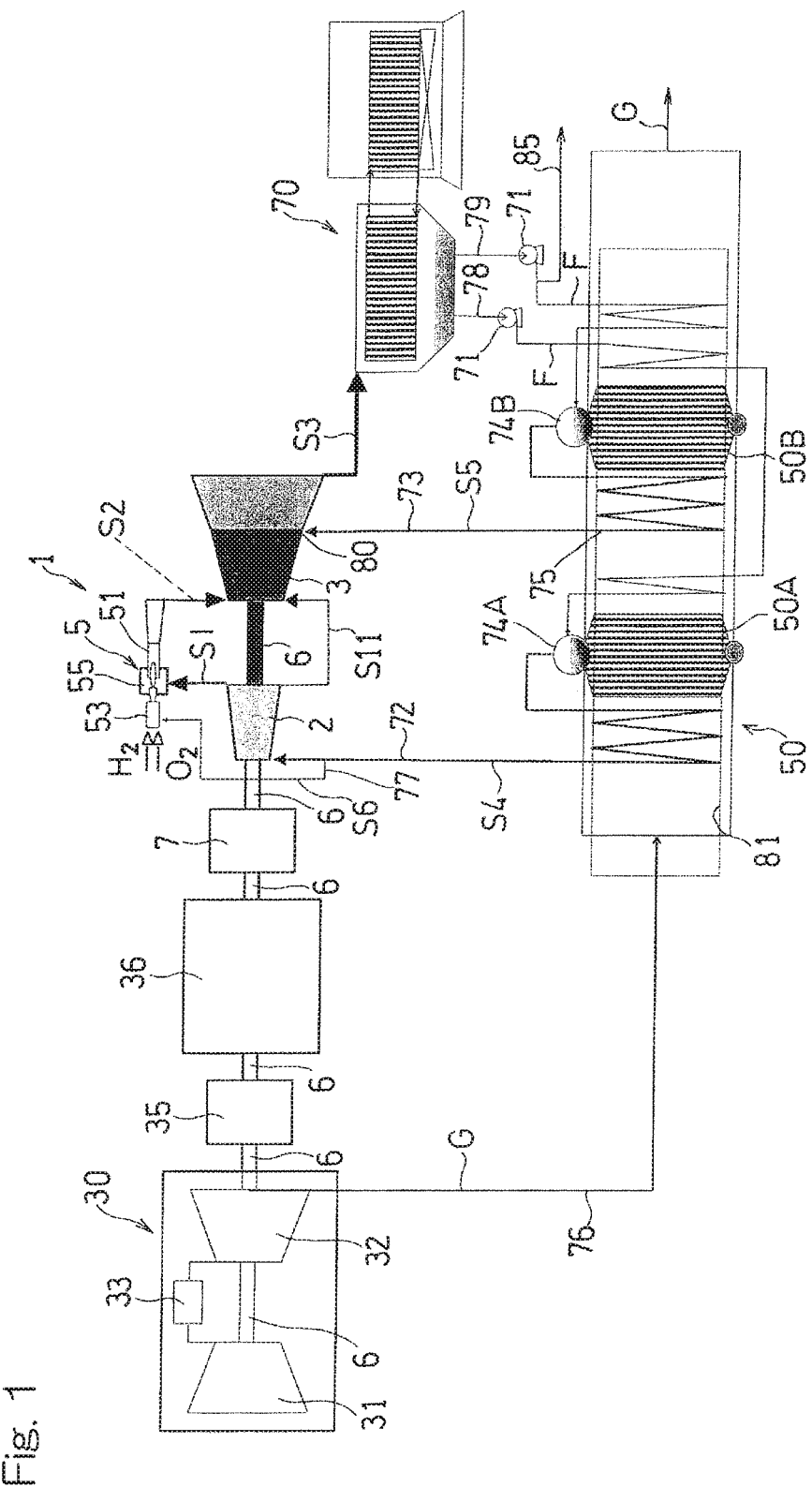
FIG. 1 schematically illustrates a configuration of a hydrogen/oxygen stoichiometric combustion turbine system according to a first embodiment of the present invention.

A first embodiment of the present invention will be described below in detail with reference to the drawings. As shown in FIG. 1, a turbine system according to the present invention includes: a steam turbine 1 structured as a hydrogen/oxygen stoichiometric combustion steam turbine (commonly called "hydrogen turbine"); a gas turbine engine 30; an exhaust gas boiler 50; and a condenser 70.

The hydrogen turbine 1 has a high-pressure steam turbine 2, a low-pressure steam turbine 3, and a heater 5 disposed between both the steam turbines 2 and 3. Discharged steam S1, discharged from the high-pressure steam turbine 2, is supplied through the heater 5 to the low-pressure steam turbine 3. A part of the steam from the high-pressure steam turbine 2 is introduced as turbine cooling steam S11 into the low-pressure steam turbine 3.

Figure 2:
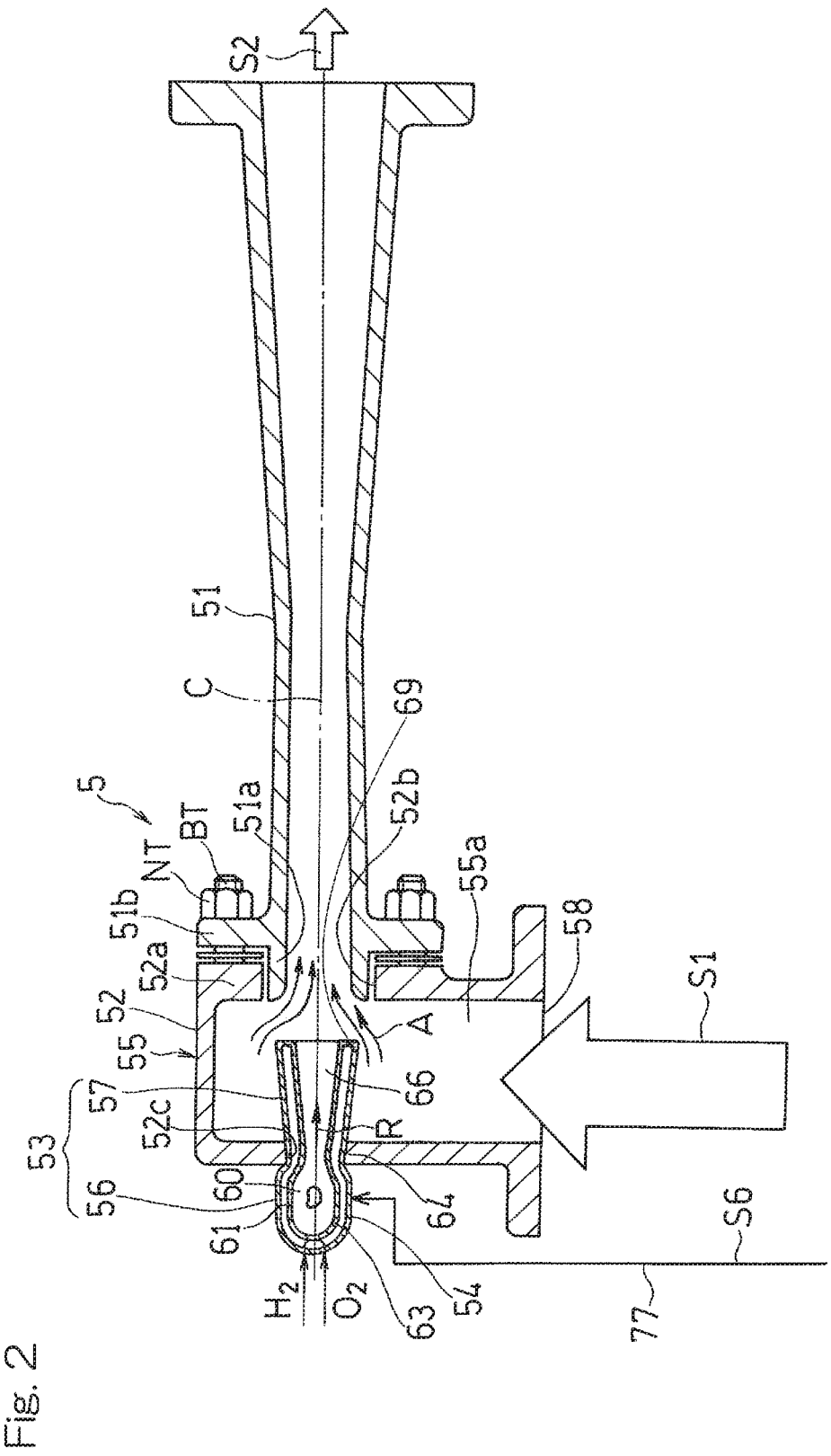
FIG. 2 is a longitudinal cross-sectional view of a heater used in the system.

As shown in FIG. 2, the heater 5 includes a combustion portion 53 in which stoichiometric combustion of hydrogen $H_2$ and oxygen $O_2$ is caused, and a mixing portion 55 that allows discharged steam S4 (FIG. 1) from the high-pressure steam turbine 2 to be introduced into the combustion portion 53, and allows the discharged steam S4 to be supplied to the low-pressure steam turbine 3. The mixing portion 55 has a diffuser 51, and a box-shaped body 52 that supports the diffuser 51. The diffuser 51 has a partially conical shape in which, for example, a passage area or a cross sectional area is substantially constant from the inlet to the intermediate portion in the flowing direction, and the passage area is gradually increased from the intermediate portion toward a discharge outlet. A mixing chamber 55a is formed inside the mixing portion 55. The lower surface of the mixing chamber 55a forms an opening 58. The discharged steam S1, discharged from an outlet of the high-pressure steam turbine 2, is introduced through the opening 58 into the mixing chamber 55a.

An attachment boss 52a is disposed on one side surface of the body 52, and an insertion hole 52b is formed in the attachment boss 52a. A stud bolt BT is embedded in the attachment boss 52a. A flange 51b with a screw hole is disposed on the outer circumference of a proximal end portion 51a of the diffuser 51. The proximal end portion 51a of the diffuser 51 is fitted in the insertion hole 52b of the attachment boss 52a of the body 52. The flange 51b, with the screw hole on the outer circumference of the proximal end portion 51a is attached to the attachment boss 52a of the body 52. In this state, the stud bolt BT of the proximal end portion 51a is inserted into an insertion hole (not shown) of the flange 51b with the screw hole, and is tightened by a nut NT. Thus, the diffuser 51 and the box-shaped body 52 that supports the diffuser 51 are connected with each other.

The combustion portion 53 includes a combustion head 56, and an ejector 57 connected to an outlet of the combustion head 56. A boundary portion 64 between the combustion head 56 and the ejector 57 forms an intermediate portion of the combustion head 56. The combustion head 56 has, for example, a round transverse cross-sectional shape. The ejector 57 has, for example, a partially conical shape in which the cross-sectional area is gradually increased towards the downstream side. The body 52 has an attaching hole 52c having the same axis C as the diffuser 51. The boundary portion 64 of the combustion portion 53 is fitted into the attaching hole 52c of the body 52, and fixed in the attaching hole 52c by welding. Thus, the combustion portion 53 is attached to the body 52 of the mixing portion 55.

The boundary portion 64 includes a boundary line BL between the combustion head 56 and the ejector 57. The ejector 57 ejects combustion gas (high-temperature steam) R from the combustion head 56, into the mixing chamber 55a, and draws or suctions, by an ejector effect, a part of the discharged steam S1 discharged through the outlet of the high-pressure steam turbine 2. The ejector 57 also has the same axis C.

Figure 3:
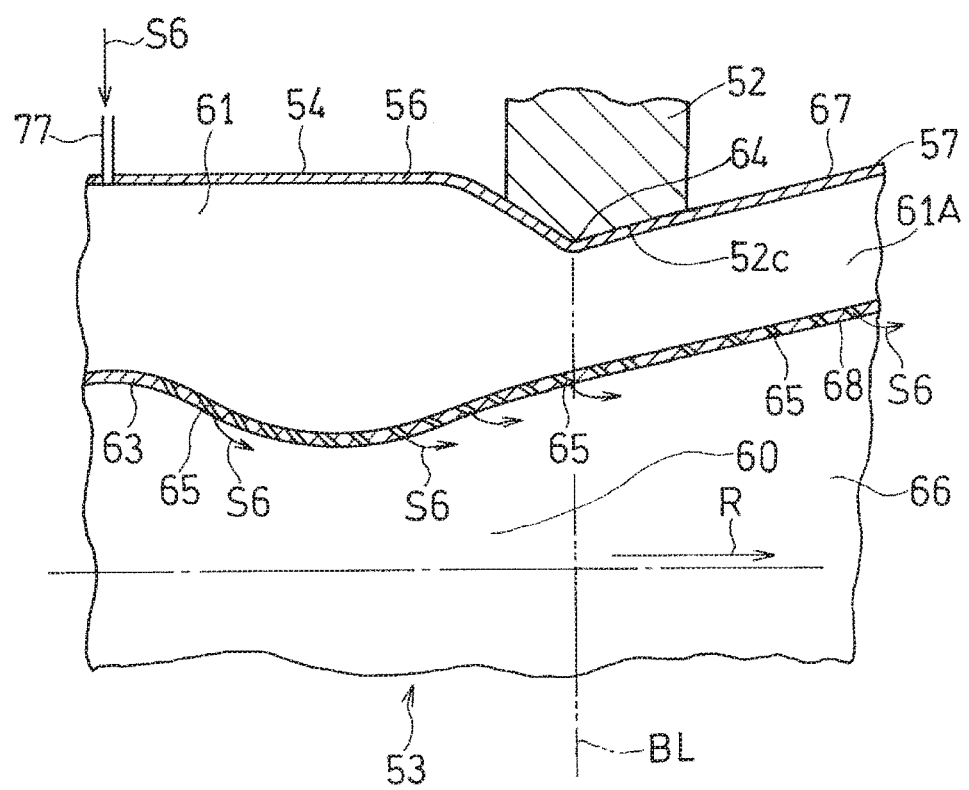
FIG. 3 is an enlarged longitudinal cross-sectional view of a main portion of a combustion portion of the heater.

A specific structure of the combustion portion 53 will be described with reference to FIG. 3. As shown in FIG. 3, the combustion head 56 of the combustion portion 53 includes a combustion chamber 60 formed at the center portion thereof, and a cooling chamber 61 that covers the combustion chamber 60 from the outer side. In the combustion chamber 60, stoichiometric combustion of hydrogen $H_2$ and oxygen $O_2$ is caused. The cooling chamber 61 cools the combustion chamber 60 from the outer side. The cooling chamber 61 is covered by an outer wall 54 of the combustion head 56. The combustion chamber 60 and the cooling chamber 61 are partitioned by a combustion chamber wall 63 that forms the combustion chamber 60.

The ejector 57 includes an ejection passage 66 through which combustion gas from the combustion chamber 60 is ejected, and a cooling chamber 61A that covers the ejection passage 66 from the outer side and cools it. The cooling chamber 61A is covered by an outer wall 67 of the ejector 57. The ejection passage 66 and the cooling chamber 61A are partitioned by an inner wall 68 of the ejector 57. Both the cooling chambers 61 and 61A are connected with each other. The downstream end of the cooling chamber 61A of the ejector 57 is closed by an end wall 69 (FIG. 2) that connects between both the downstream end portions of the outer wall 67 and the inner wall 68 of the ejector 57. Both the outer walls 54 and 67 are formed by continuous wall members. The combustion chamber wall 63 and the inner wall 68 of the ejector 57 are also formed by continuous wall members. That is, the combustion head 56 and the ejector 57 are integrated. However, both the combustion head 56 and the ejector 57 may be formed as separate members, and joined to each other by a joining means such as welding.

Cooling steam S6 is introduced through a cooling pipe 77 into the cooling chambers 61 and 61A as described below. A plurality of steam guiding holes 65 are formed in the combustion chamber wall 63 and the inner wall 68 of the ejector 57. The cooling steam S6 described below is guided into the combustion chamber 60 and the ejection passage 66 through the steam guiding holes 65. Film-cooling for the inner surfaces of the combustion chamber wall 63 and the inner wall 68 of the ejector 57 is performed by the cooling steam S6.

As shown in FIG. 2, hydrogen $H_2$ and oxygen $O_2$ are introduced into the combustion chamber 60, through a nozzle inserted into the combustion chamber 60, from a hydrogen source (not shown) such as a hydrogen cylinder and an oxygen source (not shown) such as an oxygen cylinder.

The gas turbine engine 30 shown in FIG. 1 includes a compressor 31, a turbine 32, and a combustor 33. Exhaust gas G discharged from the turbine 32 is supplied to the exhaust gas boiler 50 disposed in an exhaust passage 81. The exhaust gas boiler 50 has a first boiler 50A disposed on the upstream side in an exhaust gas flow direction in which the exhaust gas G flows, and a second boiler 50B disposed on the downstream side in the exhaust gas flow direction. Discharged steam S3, discharged from the low-pressure steam turbine 3, is condensed by the condenser 70. Water obtained by the condenser 70 is pressurized by pumps 71, 71, and is supplied from pipes 78, 79 to the first boiler 50A and the second boiler 50B of the exhaust gas boiler 50. Heat exchange between the exhaust gas G and the water is performed while the water is flowing in the water passage in the exhaust gas boiler 50.

Steam (superheated steam) obtained by the heat exchange is accumulated in a first tank 74A in the first boiler 50A. The steam S4 is supplied to an inlet of the high-pressure steam turbine 2 as main steam through a main pipe 72 (hereinafter, "pipe" is used so as to have the same meaning as "passage") that forms a main supply passage. Steam (superheated steam) obtained by the second boiler 50B, that is, steam S5 that has a relatively low temperature and is obtained at an intermediate portion 75 of the exhaust gas boiler 50 is accumulated in a second tank 74B. The steam S5 is supplied to an intermediate stage 80 of the low-pressure steam turbine 3 as secondary steam through a secondary pipe 73 that forms a secondary supply passage. Reheat steam S2 having been heated by the heater 5 has a temperature of about 900 to 1200° C., and maintains sufficient energy for driving the low-pressure steam turbine 3.

A speed reducer 35 is disposed on the turbine 32 side of the gas turbine engine 30. A speed reducer (with a clutch) 7 is disposed on the high-pressure steam turbine side of the hydrogen turbine 1. A generator 36 as a load is disposed between the speed reducers 7 and 35. All of these units 1, 7, 30, 35 and 36 are integrally connected by a common rotation shaft 6. The compressor 31 and the turbine 32 of the gas turbine engine 30 are connected by the common rotation shaft 6. However, the compressor 31 and the turbine 32 may be connected by another rotation shaft (biaxial type).

An operation performed by the hydrogen/oxygen stoichiometric combustion turbine system having the above-described structure will be described. When the gas turbine engine 30 shown in FIG. 1 operates, the exhaust gas G is fed from the turbine 32 through a pipe 76 to the exhaust gas boiler 50. The exhaust gas G flows in the exhaust passage 81 from the upstream side thereof to the downstream side thereof. Meanwhile, when the hydrogen turbine 1 operates, the discharged steam S3 discharged from the low-pressure steam turbine 3 is condensed by the condenser 70 so as to provide condensate water F, and, thereafter, the condensate water F is supplied through the pies 78, 79 to the exhaust gas boiler 50.

At this time, the discharged steam (main steam) S4 having the highest pressure in the cycle is obtained from the first boiler 50A on the upstream side of the exhaust passage 81. Most of the discharged steam S4 is supplied through the main pipe 72 to the inlet of the high-pressure steam turbine 2 of the hydrogen turbine 1. The cooling pipe 77 diverges from a position in the main pipe 72. A part of the main steam S4 is introduced as the cooling steam S6 through the cooling pipe 77 into the cooling chamber 61 of the heater 5 shown in FIG. 3. Thus, the cooling steam S6 can be effectively utilized as a coolant without separately using a coolant, to cool the combustion chamber 60. When an internal pressure in the combustion chamber 60 is set so as to be slightly lower than that of the cooling steam S6, the film-cooling described below can be performed. When the internal pressure in the combustion chamber 60 is set so as to be sufficiently higher than that at the low-pressure steam turbine inlet, high speed jet flow, by which pressure-increasing effect can be expected at the low-pressure steam turbine inlet, can be realized.

In the combustion chamber 60 of the combustion portion 53, stoichiometric combustion of hydrogen $H_2$ and oxygen $O_2$ is caused to generate combustion gas R. Meanwhile, the combustion chamber 60 is covered by the cooling chamber 61 from the outer side, and the plurality of steam guiding holes 65 are formed in the combustion chamber wall 63. The cooling steam S6 guided through the plurality of steam guiding holes 65 flows along the inner surface of the combustion chamber wall 63, whereby film-cooling for the combustion chamber wall 63 is performed. Similarly, film-cooling for the inner wall 68 of the ejector 57 is performed by the cooling steam S6 guided through the steam guiding holes 65. Thus, thermally adverse effects of the combustion gas R on the combustion chamber wall 63 and the ejector inner wall 68 can be avoided.

The cooling steam S6 is not wasted so as to be discharged to the outside after using for cooling, but is mixed with the combustion gas R in the combustion chamber 60 and the ejection passage 66. Thus, reduction of an amount of the reheat steam S2 supplied from the heater 5 to the low-pressure steam turbine 3 is prevented and as a result, reduction of output of the low-pressure steam turbine 3 can be suppressed. The outer surface of the ejector 57 is cooled by the discharged steam S1. Therefore, the cooling chamber 61A may be omitted, and a single pipe having a simple partially-conical shape may be used.

The discharged steam S1 from the outlet of the high-pressure steam turbine 2 is introduced into the mixing chamber 55a through the opening 58 on the lower surface of the mixing portion 55, as shown in FIG. 2. The combustion gas (high-temperature steam) R generated by the hydrogen/oxygen stoichiometric combustion is ejected and diffused through the ejection passage 66 of the ejector 57 into the mixing chamber 55a. At this time, the discharged steam S1 having been introduced into the mixing chamber 55a due to drawing effect of the ejector 57 is drawn as indicated by arrows A, and is guided into the diffuser 51 together with the combustion gas R generated by the hydrogen/oxygen stoichiometric combustion. While passing through the diffuser 51, the high-temperature gas R generated by the hydrogen/oxygen stoichiometric combustion is mixed with the discharged steam S1, so as to provide a mixed steam. Concurrently, the pressure of the mixed gas is increased and the temperature of the mixed gas is reduced.

Thus, the combustion gas R, generated by the hydrogen/oxygen stoichiometric combustion, is sufficiently diluted by the discharged steam S1 (about 300° C.), and then, is supplied from the diffuser 51 as the reheat steam S2 (about 900 to 1200° C.) shown in FIG. 1 to the low-pressure steam turbine 3, so as to be utilized as energy for driving the low-pressure steam turbine 3. The low-pressure steam turbine 3 has an internal cooling structure, which is similar to that of a gas turbine and which separately uses the turbine cooling steam S11 (steam cooling) in order to be resistant to steam temperature of 1200° C., unlike in a conventional steam turbine.

When the reheat steam S2 is supplied to the low-pressure steam turbine 3, steam temperature and steam pressure are increased at the inlet of the low-pressure steam turbine 3, so as to improve output and thermal efficiency. The steam S3 discharged from the low-pressure steam turbine 3 is introduced into the condenser 70, so as to provide a condensate, and the condensate is changed again into steam through the exhaust gas boiler 50 and the steam is supplied to the hydrogen turbine 1, as described above. Water which is increased in the hydrogen turbine 1 by the hydrogen/oxygen stoichiometric combustion is discharged as appropriate through a drain 85 to the outside. Thus, the hydrogen/oxygen stoichiometric combustion turbine system that allows both reduction of $CO_2$ generation and improvement of output and thermal efficiency, can be obtained.

In the above-described configuration, the combustion gas (high-temperature steam) R generated by stoichiometric combustion of hydrogen and oxygen in the combustion portion 53 of the heater 5 is quenched (quickly cooled) in the mixing portion 55 by the discharged steam S1 discharged from the high-pressure steam turbine 2. Thus, the temperature of the steam supplied to the low-pressure steam turbine 3 can be adjusted so as to be not higher than a heat-resistance limit temperature of the metal component having been cooled with steam. Furthermore, an amount of stoichiometric combustion of hydrogen and oxygen need not be reduced, whereby output and thermal efficiency can be improved. By using the hydrogen turbine, $CO_2$ generation can be reduced.

As described above, the steam R ejected by the ejector 57 shown in FIG. 2 and the discharged steam S1 drawn by the ejector effect are mixed in the diffuser 51, so as to provide the mixed steam, and as a result, the temperature of the mixed gas is reduced. Accordingly, steam having appropriate temperature and pressure can be obtained with a simple structure.

The combustion portion 53 of the heater 5 has the combustion chamber 60, in which stoichiometric combustion of hydrogen and oxygen is caused, and the cooling chamber 61 that covers the combustion chamber 60 from the outer side and cools it, and a part of the main steam S4 supplied to the high-pressure steam turbine 2 is introduced into the cooling chamber 61 as the cooling steam S6. Therefore, the cooling steam S6 is effectively utilized as a coolant without separately using a coolant, to cool the combustion chamber 60.

The steam guiding holes 65 are formed in the combustion chamber wall 63 that forms the combustion chamber 60 shown in FIG. 3, and the cooling steam S6 in the cooling chamber 61 is introduced through the steam guiding holes 65 into the combustion chamber 60, and the inner surface of the combustion chamber wall 63 is cooled by the cooling steam S6. Thus, the combustion chamber wall 63 can be suppressed from having a high temperature, and effective cooling to an appropriate temperature can be performed with a simple structure.

Furthermore, the hydrogen/oxygen stoichiometric combustion turbine system shown in FIG. 1 has the gas turbine engine 30 and the exhaust gas boiler 50 that uses the exhaust gas G of the gas turbine engine 30 as a heat source, and the main steam S4 obtained by the exhaust gas boiler 50 is supplied to the high-pressure steam turbine 2. Thus, the exhaust gas G from the gas turbine engine 30 can be effectively used without waste, and the system that has high output and high efficiency can be obtained.

Furthermore, the secondary steam S5 obtained by the intermediate portion 75 of the exhaust gas boiler 50 is supplied through the secondary pipe 73 to the intermediate stage 80 of the low-pressure steam turbine 3. Thus, at the intermediate stage 80 of the low-pressure steam turbine 3 and the following stages, steam pressure can be increased, so as to improve output.

Moreover, the hydrogen/oxygen stoichiometric combustion turbine system according to the present embodiment includes the generator 36 driven by the high-pressure steam turbine 2, the low-pressure steam turbine 3 and the gas turbine engine 30. Therefore, rotary force obtained by the gas turbine engine 30 and rotary forces from the high-pressure steam turbine 2 and the low-pressure steam turbine 3 are added, whereby a high-output and high-efficiency generation system can be obtained.

In the hydrogen/oxygen stoichiometric combustion turbine system according to the present embodiment, an exemplary case is described in which the gas turbine engine 30 is used as a turbine disposed in combination with the hydrogen turbine 1 shown in FIG. 1. However, the turbine is not limited to the gas turbine engine 30, and, for example, an incineration turbine for refuse incineration facilities or another turbine may be disposed in combination. In any case, the hydrogen/oxygen stoichiometric combustion turbine system that allows reduction of $CO_2$ generation and improvement of thermal efficiency can be obtained. Furthermore, when the gas turbine engine also uses hydrogen as fuel, a complete $CO_2$ free generation system can be realized.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . steam turbine (hydrogen turbine)
2 . . . high-pressure steam turbine
3 . . . low-pressure steam turbine
5 . . . heater
6 . . . rotation shaft
7 . . . speed reducer (with clutch)
30 . . . gas turbine engine
32 . . . turbine
35 . . . speed reducer
36 . . . generator
50 . . . exhaust gas boiler
51 . . . diffuser
53 . . . combustion portion
55 . . . mixing portion
55a . . . mixing chamber
57 . . . ejector
60 . . . combustion chamber
61 . . . cooling chamber
63 . . . combustion chamber wall
65 . . . steam guiding hole
R . . . combustion gas (high-temperature steam)
S1 . . . steam from high-pressure steam turbine outlet
S2 . . . reheat steam
S4 . . . discharged steam (main steam)
S5 . . . discharged steam (secondary steam)
S6 . . . cooling steam

What is claimed is:

1. A hydrogen/oxygen stoichiometric combustion turbine system comprising:
   a high-pressure steam turbine;
   a low-pressure steam turbine; and
   a heater disposed between the high-pressure and low-pressure steam turbines, wherein
   the heater has:
     a combustion portion in which stoichiometric combustion of hydrogen and oxygen is caused to provide a high-temperature steam; and
     a mixing portion configured to mix discharged steam, discharged from the high-pressure steam turbine and directly to the mixing portion, with the high-temperature steam from the combustion portion so as to provide a mixed steam and to supply the mixed steam to the low-pressure steam turbine,
   wherein the combustion portion has:
     a combustion chamber in which stoichiometric combustion of hydrogen and oxygen is caused; and
     a cooling chamber configured to cover the combustion chamber from an outer side and to cool it, and
   a part of main steam supplied to the high-pressure steam turbine is introduced as cooling steam into the cooling chamber,
   wherein the hydrogen/oxygen stoichiometric combustion turbine system further comprises:
     a main pipe that supplies the main steam to the high-pressure steam turbine; and
     a cooling pipe that branches from the main pipe to the cooling chamber,
   wherein the cooling pipe supplies the part of the main steam directly to the cooling chamber, and
   wherein the cooling chamber provides the part of the main steam into the combustion portion.

2. The hydrogen/oxygen stoichiometric combustion turbine system as claimed in claim 1, wherein
   the combustion portion has:
     a combustion chamber in which stoichiometric combustion of hydrogen and oxygen is caused; and
     an ejector configured to eject the high-temperature steam from the combustion chamber into a mixing chamber, formed in the mixing portion, and to draw the discharged steam, and
   the mixing portion has a diffuser configured to expand steam from the ejector, and increase pressure and reduce temperature of the steam.

3. The hydrogen/oxygen stoichiometric combustion turbine system as claimed in claim 1, wherein
   the combustion chamber portion includes a combustion chamber wall that forms the combustion chamber, and
   the combustion chamber wall is provided with a steam guiding hole for guiding the cooling steam in the cooling chamber, into the combustion chamber, and allowing film-cooling for an inner surface of the combustion chamber wall.

4. The hydrogen/oxygen stoichiometric combustion turbine system as claimed in claim 1, further comprising:
   a gas turbine engine connected to the low-pressure steam turbine and the high-pressure steam turbine; and
   an exhaust gas boiler configured to use exhaust gas of the gas turbine engine as a heat source, wherein
   main steam obtained by the exhaust gas boiler is supplied to the high-pressure steam turbine.

5. The hydrogen/oxygen stoichiometric combustion turbine system as claimed in claim 4, wherein secondary steam obtained at an intermediate portion of the exhaust gas boiler is supplied to an intermediate stage of the low-pressure steam turbine.

6. The hydrogen/oxygen stoichiometric combustion turbine system as claimed in claim 4, further comprising a generator driven by the low-pressure steam turbine, the high-pressure steam turbine and the gas turbine engine.

7. The hydrogen/oxygen stoichiometric combustion turbine system as claimed in claim 1, wherein
   the high-temperature steam from the combustion portion comprises the part of the main steam mixed with the combustion gas generated by the stoichiometric combustion, and
   the discharged steam, discharged from the high-pressure steam turbine, is mixed in the mixing chamber with the high-temperature steam from the combustion portion.

8. A hydrogen/oxygen stoichiometric combustion turbine system comprising:
   a high-pressure steam turbine;
   a low-pressure steam turbine; and
   a heater disposed between the high-pressure and low-pressure steam turbines, wherein
   the heater has:
     a combustion portion in which stoichiometric combustion of hydrogen and oxygen is caused to provide a high-temperature steam; and
     a mixing portion configured to mix discharged steam, discharged from the high-pressure steam turbine, with the high-temperature steam from the combustion portion so as to provide a mixed steam and to supply the mixed steam to the low-pressure steam turbine, the combustion portion has:
- a combustion chamber in which stoichiometric combustion of hydrogen and oxygen is caused; and
- a cooling chamber configured to cover the combustion chamber from an outer side and to cool it, and a part of main steam supplied to the high-pressure steam turbine is introduced as cooling steam into the cooling chamber, wherein the combustion portion has:
- a combustion chamber in which stoichiometric combustion of hydrogen and oxygen is caused: and
- a cooling chamber configured to cover the combustion chamber from an outer side and to cool it, and a part of main steam supplied to the high-pressure steam turbine is introduced as cooling steam into the cooling chamber, wherein the hydrogen/oxygen stoichiometric combustion turbine system further comprises:
- a main pipe that supplies the main steam to the high-pressure steam turbine; and
- a cooling pipe that branches from the main pipe to the cooling chamber, wherein the cooling pipe supplies the part of the main steam directly to the cooling chamber, and wherein the cooling chamber provides the part of the main steam into the combustion portion.

* * * * *